(12) United States Patent
Padhy et al.

(10) Patent No.: US 9,430,317 B2
(45) Date of Patent: Aug. 30, 2016

(54) CODING FOR NON FUNCTIONAL KEYS OF A KEYBOARD OR KEYPAD

(75) Inventors: Manasi Padhy, Bangalore (IN); Ashwin Kumar T.C., Bangalore (IN); Ravi Kant Singh, Bangalore (IN); Raghavendra Mylarappa, Bangalore (IN); Sachin Vyas, Bangalore (IN)

(73) Assignee: ST-Ericsson SA, Plan-les-Ouates (CH)

( * ) Notice: Subject to any disclaimer, the term of this patent is extended or adjusted under 35 U.S.C. 154(b) by 823 days.

(21) Appl. No.: 13/141,415

(22) PCT Filed: Dec. 23, 2009

(86) PCT No.: PCT/IN2009/000738
§ 371 (c)(1),
(2), (4) Date: Aug. 2, 2011

(87) PCT Pub. No.: WO2010/073264
PCT Pub. Date: Jul. 1, 2010

(65) Prior Publication Data
US 2011/0279291 A1 Nov. 17, 2011

(30) Foreign Application Priority Data
Dec. 24, 2008 (IN) .......................... 3273/CHE/2008

(51) Int. Cl.
*H03M 11/00* (2006.01)
*G06F 11/07* (2006.01)
(Continued)

(52) U.S. Cl.
CPC .......... *G06F 11/0793* (2013.01); *G06F 3/0238* (2013.01); *G06F 11/0742* (2013.01); *G06F 11/0745* (2013.01); *H04M 1/2472* (2013.01); *H04M 1/7258* (2013.01)

(58) Field of Classification Search
CPC .............................. G06F 3/023; H03M 11/00
See application file for complete search history.

(56) References Cited

U.S. PATENT DOCUMENTS 4,844,637 A * 7/1989 Buisson et al. .................. 341/23
6,107,994 A * 8/2000 Harada et al. ................. 345/168
(Continued)

FOREIGN PATENT DOCUMENTS

| CN | 1996262 A | 7/2007 |
|---|---|---|
| CN | 101202814 A | 6/2008 |
| JP | 01088618 A | 4/1989 |

OTHER PUBLICATIONS

Guntner M. et al., "Mehr Als Eine Tastatur", Elektronik, Weka Fachzeitschriftenverlag, Poing, DE, vol. 36, No. 21, Oct. 16, 1987, pp. 126-130, XP000030968, ISSN: 0013-5658.
(Continued)

*Primary Examiner* — Benjamin C Lee
*Assistant Examiner* — Rajsheed Black-Childress
(74) *Attorney, Agent, or Firm* — Coats & Bennett, PLLC (57) ABSTRACT

Described herein are methods and systems for performing functions associated with a non-functional key of a keyboard present on electronic devices such as cell-phones, telephones, ATMs, etc. The electronic device is operated in a non-functional key (NFK) coding mode using NFK codes (108) that are provided to a memory component (202) of the electronic device (102). In the NFK coding mode, a user is allowed to enter functional keys in a coded sequence. Based on the NFK codes (108), the coded sequence is used to identify a function associated with a non-functional key of the keyboard and the identified function is indicated to a processor (204) of the electronic device (102) for execution.

17 Claims, 5 Drawing Sheets

(51) Int. Cl.
*G06F 3/023* (2006.01)
*H04M 1/247* (2006.01)
*H04M 1/725* (2006.01)

(56) References Cited

U.S. PATENT DOCUMENTS 6,184,803 B1 * 2/2001 Burrell, IV ............... 341/22
7,071,845 B2 * 7/2006 Ivancic ..................... 341/23
2004/0127177 A1 * 7/2004 Kamitani ................. 455/130
2007/0204039 A1 * 8/2007 Inamdar .................. 709/225

OTHER PUBLICATIONS

Sony Ericsson Mobule Communications AB:, "Developers Guideline Bluetooth HID Remote Control, (K700 series, S700 series, V800 series)" Internet Citation Oct. 1, 2004, XP007901961, Retrieved from Internet: URL:http://mybox.trenger.ro/{torgeir/dg_hid_bt_rtb.pdf.

* cited by examiner

CODING FOR NON FUNCTIONAL KEYS OF A KEYBOARD OR KEYPAD

This application claims priority to Indian patent application IN 3273/CHE/2008, filed Dec. 24, 2008.

TECHNICAL FIELD

The subject matter described herein, in general, relates to electronic devices and in particular relates to electronic devices that include a keyboard/keypad.

BACKGROUND

Keypad and keyboard are generic terms used to describe a part of a hardware device that has a number of mechanical or electro-mechanical buttons or keys. The keys can be actuated by pressing them to enter values or characters into an electronic device or to enter a command for an action to be performed by the electronic device. The keyboard or keypad is generally connected to a processor, which monitors the keyboard circuitry and detects which key or keys are actuated by a user.

Conventional keyboards comprise a number of keys, each key indicating one or more characters or actions, which are easily identifiable by users. Types of keys may vary from model to model, however, almost all of the keyboards have alphanumeric keys and/or special purpose keys. Such keyboards and keypads are extensively used in electronic devices including user equipments such as DVD players, TV remote controllers, computers and calculators; and communication devices like laptops, cell-phones, Automated Teller Machine (ATM) machines, etc.

In the recent past, the popularity of small sized electronic devices has increased tremendously. Cell-phones, for example, have become so compact and sleek that they easily fit in the smallest of the pockets. As the size of the electronic devices has decreased, the size of the keyboards or keypads has also decreased, thus persuading manufacturers to make keyboards or keypads in which each key can input multiple characters or values. However, in such devices, even if a single key or button becomes nonfunctional, all the functions associated with the key have to be put on hold till the time the key is repaired.

In the simplest of the keyboards or keypads also, in which every key corresponds to a single character or action, if a single key is rendered nonfunctional due to any mechanical or electronic fault, many critical functions of the device are severely hindered. For instance, if a number key of a cell-phone malfunctions, a user of the cell-phone may be prevented from making any call to phone numbers which include the numeral associated with the malfunctioning key. Similarly, if a key associated with the phonebook option of a cell-phone is faulty, a person would not be able to browse to obtain an important number in case of an emergency. In another example, malfunctioning of a key of an ATM may withhold crucial transactions.

More often than not, a malfunctioning key of a keyboard can be fixed only by hardware replacements. Either the malfunctioning key or the entire keyboard needs to be replaced, which is always a costly solution. The replacement of components requires procuring those components, which sometimes may not be readily available. In addition, substitution of components of an expensive device such a cell-phone or a laptop is not often desired since it hampers the aesthetics of the device. Also, one or more visits to service centers may be required for replacement of the components, resulting in wastage of time and inconvenience to a user.

SUMMARY

The subject matter described herein is directed towards methods and systems for performing a function, associated with a non-functional key of a keyboard/keypad of an electronic device such as telephones, cell-phones, ATM machines or other user equipments such as remote controllers, calculators, DVD players and so on. This summary is not intended to identify essential features of the claimed subject matter, nor is it intended for use in determining the scope of the claimed subject matter.

The methods and systems described herein allow a user to perform functions associated with a key that has stopped functioning. The function may include entry of a character, such as a digit, an alphabet or a symbol; or entry of a command that performs a specific action in the device.

In one implementation of the present subject matter, the system and method of performing a function associated with a non-functional key of a keyboard is implemented using the functional keys and/or spare keys of the keyboard. For this, a non-functional key coding mode, hereinafter referred to as an NFK coding mode can be activated for the keyboard. In the NFK coding mode, a coded sequence of one or more functional keys can be actuated by a user to indicate a function of the non-functional key to a processor of the electronic device. Non-functional key codes or NFK codes are used to determine the function of the non-functional key that corresponds to the actuated coded sequence. In one implementation, when the user actuates the functional keys in a coded sequence, all the functions associated with a particular non-functional key get displayed. The user can then select and enter the desired non-functional key function from amongst the displayed ones.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The disclosed subject matter relates to coding for a non-functional key of a keyboard or keypad. The methods and systems described herein enable a user to perform functions associated with a non-functional key of a keyboard or keypad.

Electronic devices, such as cell-phones, laptops, personal digital assistants (PDAs), telephones, remote controllers, calculators, and so on are provided with a keypad or a keyboard as an input device. Every key of the keyboard is associated with one or more functions such as entry of alphanumeric characters, values, or symbols. The function may also include entering commands to perform a specific action in the device. For instance, a key in a multimedia keyboard of a computer may be used to enter a command to operate a disk drive of the computer. In another example a key in a cell-phone may be used to enter a command to open the phone book. Actuation of a key indicates, to a processor of the electronic device, that the function associated with the key is to be performed.

Typically, in case a key of the keyboard of the electronic device becomes non-functional, the functions associated with the non-functional key are not indicated to the processor and, as a result, the function is not performed. The methods and systems described herein may be used to perform a function associated with the non-functional key of the keyboard. In one implementation, the systems and methods employed involve use of other functional keys of the keyboard as a substitute for the non-functional key. In another implementation, in case spare keys are available on the keyboard or keypad, they can be configured to act as replacement keys for the non-functional key.

Thus, a user can effectively perform functions of the key that has become non-functional without opting for hardware changes. Also, such a configuration of a keyboard or keypad can be used as a temporary solution as well as a permanent solution, and is also helpful to users who feel helpless during an emergency because of a fault in the key(s). These methods and systems are specifically useful in user equipments such as a cell-phone, laptop, an ATM and the like, and in cases where an urgent call or transaction cannot wait for replacement of a non-functional key. In one embodiment, when a key of a keyboard becomes non-functional, the electronic device implementing the keyboard can be operated in a non-functional key coding mode, hereinafter referred to as an NFK coding mode. In the NFK coding mode, all the functions associated with one or more non-functional keys are assigned distinct NFK codes. These codes correspond to sequences of other functional keys present on the keyboard. Various sequences i.e. permutations and combinations of the functional keys are associated with the different NKF codes. When functional keys are actuated in a sequence corresponding to an NFK code, the function associated with the non-functional key is identified using the NFK code. Thus, for every non-functional key, actuation of one or more functional keys in to a coded sequence results in performance of the function of a particular non-functional key that corresponds to the coded sequence.

In one implementation, the aforesaid functionality can be achieved using NFK codes that can be downloaded onto a memory component of the electronic device whenever the user activates the NFK coding mode. In an alternative implementation, the NFK codes can be user configured using an application present in the electronic device. In yet another implementation, the NFK codes may be pre-configured in the memory so as to be readily available as and when the NFK coding mode is activated. Furthermore, the coded sequences associated with various NFK codes may also be defined by the user or preconfigured in the device.

Figure 1:
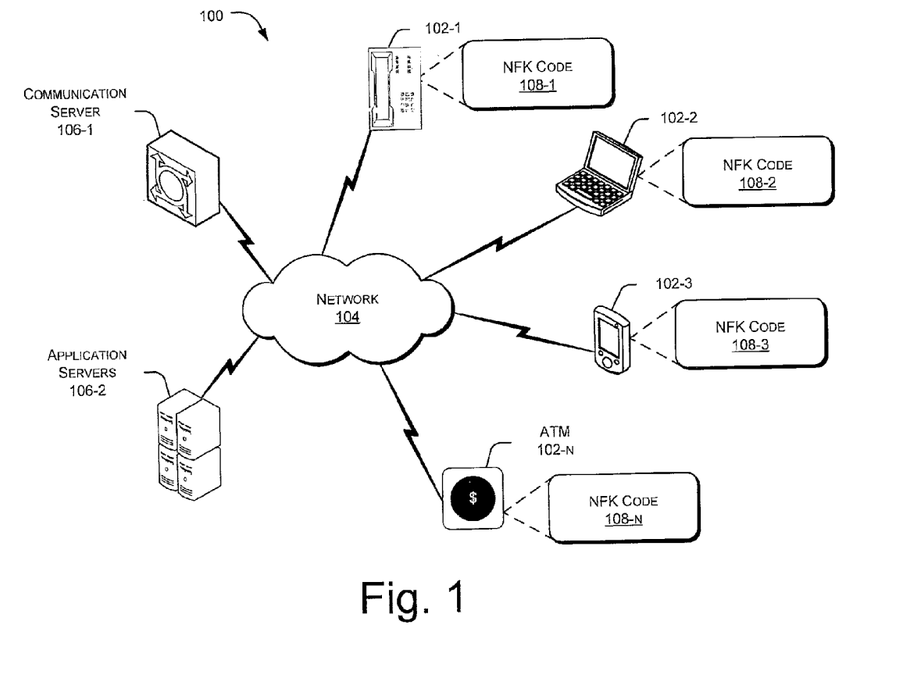
FIG. 1 illustrates an exemplary network environment for implementation of a system and/or method for coding of a non-functional key of a keyboard of an electronic device, in accordance with an embodiment of the present subject matter.

FIG. 1 illustrates an exemplary network environment for implementation of a system and/or method for coding of a non-functional key of a keyboard of an electronic device, in accordance with an embodiment of the present subject matter. As shown, one or more electronic device(s) 102, such as 102-1, 102-2, 102-3, . . . 102-N, can be connected to a network 104. Without limiting and in accordance with the scope of the present subject matter, the electronic devices 102 illustrated in FIG. 1 may include telephones, laptops, PDAs, cell-phones, and ATMs. Furthermore, in one embodiment, electronic devices 102, such as 102-1, 102-2, 102-3, . . . , and 102-N can include user equipments such as TV remote controllers, DVD players and calculators that can work as stand alone devices and need not be connected to the network 104.

In one embodiment, the electronic devices 102, connected to the network 104, may be configured to operate in the NFK coding mode using a server 106 communicating with the electronic device 102 through the network 104. In another embodiment, the stand alone electronic devices 102 working independent of the server 106 may be preconfigured to operate in the NFK coding mode. Also, in one implementation, electronic devices 102, such as a communication device, typically connected to the network 104 during use may also be configured in the NFK coding mode without connecting to the network 104, in a manner similar to that used for a stand alone device.

The network 104 may be a wired or wireless network or a combination of the two. The network 104 may include multiple small networks including computer networks, mobile phone networks, telephone networks and the like. The electronic devices 102 are connected to the server 106, which may be a communication server such as 106-1 or one or more application servers 106-2 or other servers, via the network 104. The electronic devices 102 communicate with the servers 106 in various modes and ways known in the art.

When an electronic device 102 needs to be operated in the NFK coding mode due to nonfunctioning of any key, the user may activate the NFK coding mode by giving a specified command, for example, by pressing a hash key thrice (###). Such a command is referred to as an NFK coding initiation command.

In another implementation, the NFK coding mode initiation may be voice activated. This may be implemented using an application such a voice recognition application. The application can initiate the NFK coding mode based on receiving a predefined set of commands/keywords. For example, if the key corresponding to the number "1" is non-functional, a user may provide a voice command such as "Start Code, One, Uses, Two, End Code". The application can then recognize that the key corresponding to the number "1" is non-functional and that the user would like to code the key based on a sequence of keys that includes the key corresponding to the number "2".

On receiving the NFK coding initiation command, the NFK coding mode is activated by either sending a request to servers 106 for downloading NFK codes 108 through the network 104 or by retrieving pre-existing NFK codes 108 stored in the memory component of the device 102. In another implementation, the device 102 may prompt the user to enter a preferred combination of functional keys to substitute for a function of a non-functional key and may accordingly configure the NFK codes on the device 102.

In case a request is sent to the server 106 for activation of the NFK coding mode, the request can be sent through a short message service (SMS) message, a phone call, an application or a web page. In one implementation, a user can ask an operator to activate the NFK coding mode through the network 104. The request can include a description of the device 102 and a list of key(s) that are non-functional. In addition, the user may also send a preference of codes or sequence of functional keys to be used to substitute the non-functional keys. In response to the request, the server 106 sends one or more sets of NFK codes 108 to the device 102. The NFK codes 108 are downloaded onto a memory component of the device 102 and are saved for all future use.

Alternatively, the memory component of the electronic device 102 may include an application that allows a user to configure the NFK codes 108 and use them as and when the NFK coding mode is activated in the electronic device 102. In such an implementation, the device 102 may not be connected to the network 104 and may be a stand alone device. A method of configuring NFK codes 108 using an application has been explained in details in the description of FIG. 5.

Further, the NFK codes 108, once activated, may also be reset, for example, when the hardware is replaced or the non-functional keys are repaired. The resetting may be carried out in a manner similar to the initiation of the NFK coding mode as described earlier. For example, the user may either reset the NFK codes 108 using an application provided on the device 102 or send a request to the operator to reset the codes. The resetting may also be carried out by actuating an NFK coding reset command.

For purposes of illustration, consider a case where a user of a cell-phone detects a malfunctioning key and desires to operate the cell-phone in the NFK coding mode. The user may instigate the NFK coding mode in a number of ways. In one implementation, the cell-phone user may call an operator and request activation of NFK coding mode on the cell-phone. In such an implementation, the activation of NFK coding mode is interactive and the user may be provided with an option for defining a specific coded sequence corresponding to each function of the malfunctioning key. Subsequently, the operator may activate the NFK coding mode and enable the user to apply the user defined coded sequence as a substitute for the different functions of the malfunctioning key.

Alternatively, the user may activate the NFK coding mode on his cell-phone, in a non-interactive mode, by sending a request for NFK codes 108 to the service provider of the cell-phone via short message service (SMS), Unstructured Supplementary Service Data (USSD) string, multimedia messaging service (MMS) message, a web application or by other methods known in the art. The request can include a list of keys that are non-functional. In the non-interactive mode, the user can download system generated NFK codes 108 from the service provider. In yet another scenario, the user may configure the NFK codes 108 using an application program available on the cell-phone. The application program may be secured using a password or an identification key to protect the device 102.

Though the above illustration has been described with reference to a cell-phone, it will be understood that the NFK coding modes can be implemented in any electronic device 102 which uses one or more keys for data entry or for performing various functions.

Figure 2:
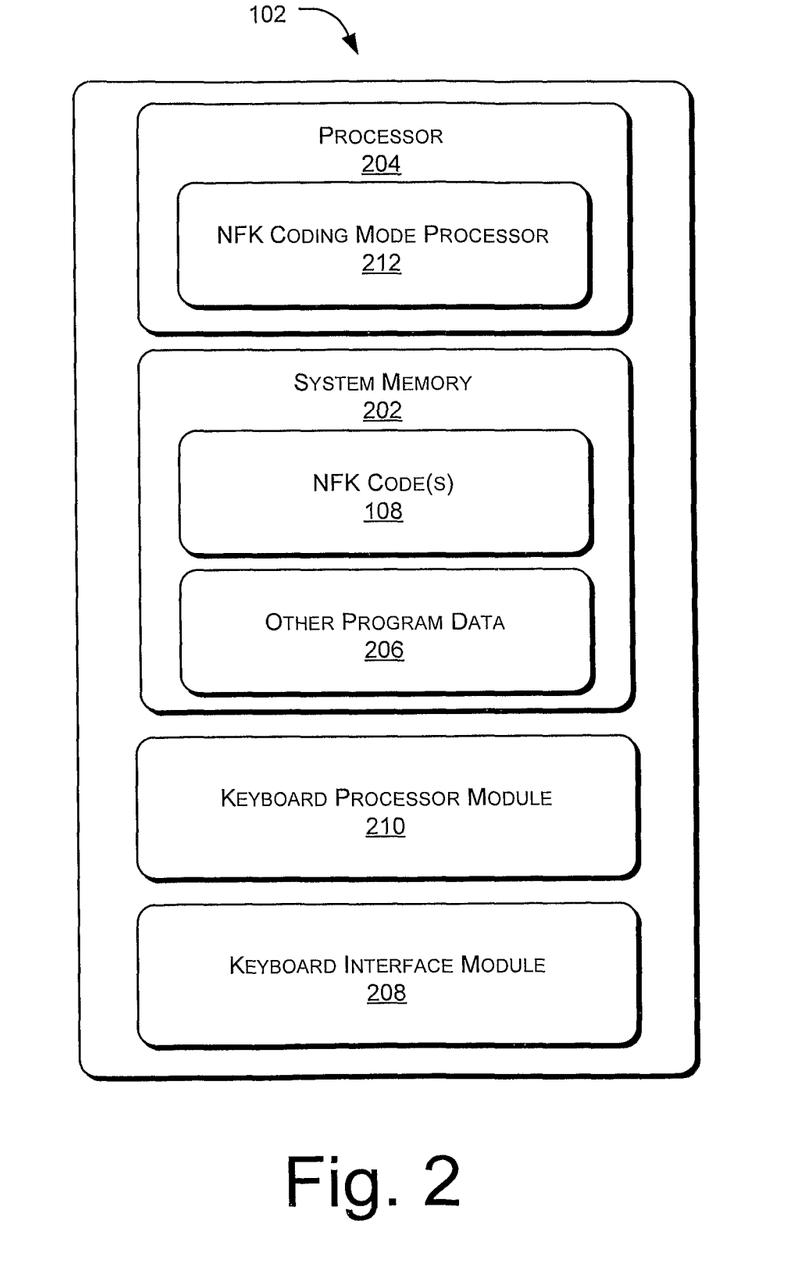
FIG. 2 shows an exemplary electronic device implementing the system as described in FIG. 1.

FIG. 2 shows details of an exemplary electronic device 102 for implementing the coding for non-functional key(s).

The exemplary electronic device 102, includes a system memory 202 coupled to a processor 204. The memory 202 stores the NFK codes 108. The memory may also hold other program data 206 including all types of data such as user input data, intermediate data to be processed by the processor, various applications and the like.

The electronic device 102 further includes a keyboard interface module 208 and a keyboard processor module 210 to enable communication between a keyboard of the electronic device 102 and the processor 204. When a key provided on the keyboard of the electronic device 102 is pressed, the mechanical impact is converted into an electrical signal by the keyboard interface module 208. The signal is transmitted to the keyboard processor module 210 for identification purposes. The keyboard processor module 210 identifies the key that has been actuated based on the signal received from the keyboard interface module 208. On identifying the key, the keyboard processor module 210 communicates the signal or inputs received from the electronic device to the processor 204 for processing purposes.

Whenever an NFK coding initiation command is detected, the keyboard processor module 210 communicates the command to the processor 204. The processor 204 triggers an NFK coding mode processor 212 present within the processor 204 to activate the NFK coding mode. The NFK coding mode processor 212 either calls upon the already existing NFK codes 108 present in the memory 202 or executes an application for configuring the NFK codes 108 or sends a request to the server 106 for downloading the NFK codes 108 as explained earlier. Both the downloaded NFK codes 108 and user configured NFK codes 108 are stored in the memory 202. Once the NFK codes 108 are available in the memory 202, the NFK coding mode operation is initiated.

On initiation of the NFK coding mode operation, the NFK code 108 of every function associated with a non-functional key can be used to indicate the function to the processor 204. For the purpose, the NFK code 108 of each of the function is associated with a distinct coded sequence of one or more non-functional keys.

When the keyboard interface module 208 detects the actuation of one or more functional keys in a coded sequence, by a user, the sequence is communicated to the keyboard processor module 210. A coded sequence received whilst the NFK coding mode is active, is communicated to the NFK coding mode processor 212 by the keyboard processor module 210. In response to the communication, the NFK coding mode processor 212 retrieves the NFK code 108 associated with the sequence and, in effect, identifies the function corresponding to the NFK code. Thus, a coded sequence actuated through an external interface, such as the keyboard of the device 102, causes the processor 204 to invoke an NFK code 108 internally and perform the function associated with it. In other words, upon the initiation of the NFK coding mode, whenever the user actuates the functional keys in the coded sequence, the corresponding function of a non-functional key can be entered as input into the processor 204.

The processor 204 enables the performance of the function by methods known in the art. Thus, by actuating the coded sequence associated with a function of a non-functional key, the user is enabled to perform a function associated with the non-functional key.

For purposes of illustration, consider a case where the key associated with the numeral '2' on the keyboard of an ATM turns non-functional. An operator may then decide to operate the machine in the NFK coding mode. To begin the NFK coding mode, the operator gives an NFK coding initiation command. Once the machine starts operating in the NFK coding mode, the machine may display a message on a display screen to prompt the operator to actuate a coded sequence corresponding to the non-functional key in order to perform a function associated with the non-functional key. For example, the display may project a message "to enter 2 press ##8", where ##8 is the coded sequence corresponding to the non-functional key associated with the numeral '2'.

In operation, upon the actuation of the NFK coding initiation command, the processor 204 of the machine activates the NFK coding mode processor 212 of the machine. Subsequent to the activation, upon actuation of the coded sequence ##8, the NFK coding mode processor 212, searches NFK codes 108 and determines the corresponding function i.e. entry of the character "2", based on the NFK codes 108.

For illustration, consider an implementation where NFK codes are assigned binary values in the form of binary strings. Each NFK code is assigned a distinct binary value such as 00001, 00010, 00011 . . . and so on, and the codes are implemented in the form of a look-up table where against each binary value a function is indicated. On actuation of a coded sequence, say ##8, the look-up table is searched to identify the corresponding binary string, say 00011, and the function that maps onto the binary string, i.e. entry of the character "2", is performed.

It will understood by the one skilled in the art that NFK codes need not necessarily be implemented as binary strings. By using various techniques of programming known in the art, non-binary strings, such as decimal strings or alphanumeric string may be assigned to NFK codes. In one embodiment, a string assigned to an NFK code may directly match with a coded sequence corresponding to the NFK code. In such an implementation, actuation of the coded sequence may directly result in identification of the associated function.

In one implementation, once the NFK coding mode is activated, a symbol is displayed on a display screen of the device 102 to inform the user that the NFK coding mode is in active state. In one embodiment, the coded sequence that needs to be actuated to indicate the functions of a non-functional key using the NFK codes 108 may also be displayed to the user. Further, a help menu for the coded sequence may also be made accessible to the user.

Figure 3:
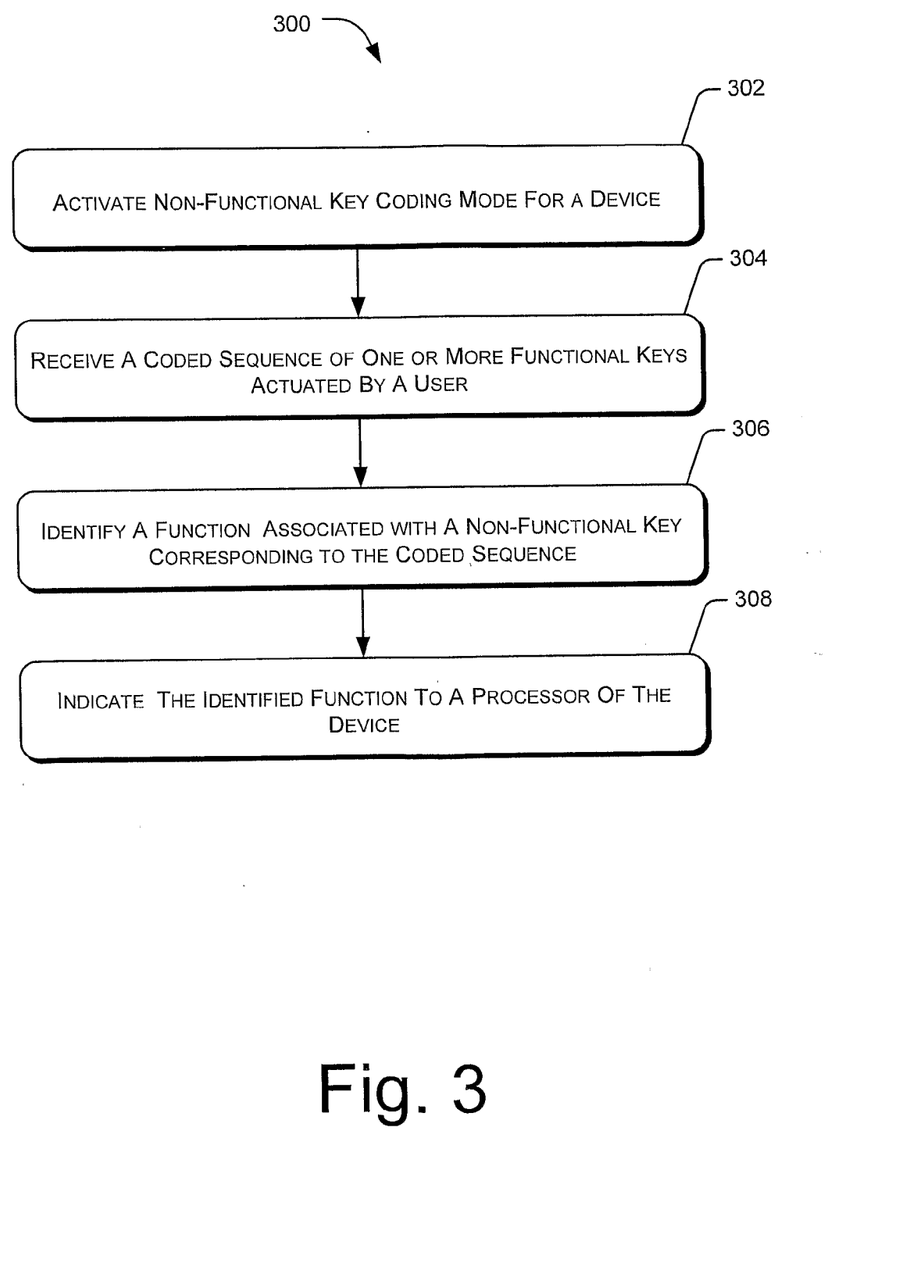
FIG. 3 illustrates an exemplary method of performing a function associated with a non-functional key of a keyboard of an electronic device, in accordance with an embodiment of the present subject matter.
Figure 4:
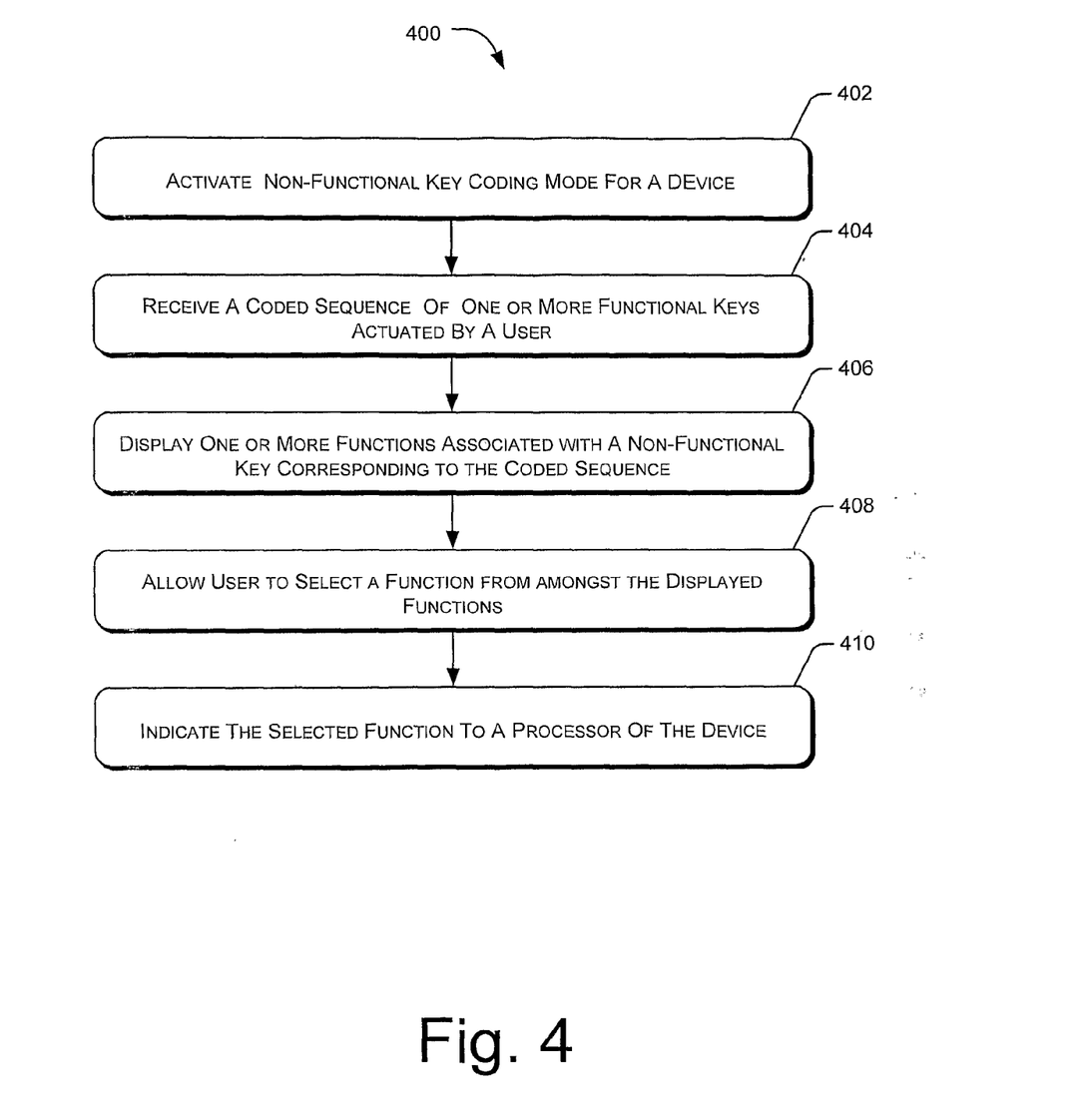
FIG. 4 illustrates an exemplary method of performing a function associated with a non-functional key of a keyboard of an electronic device, in accordance with another embodiment of the present subject matter.
Figure 5:
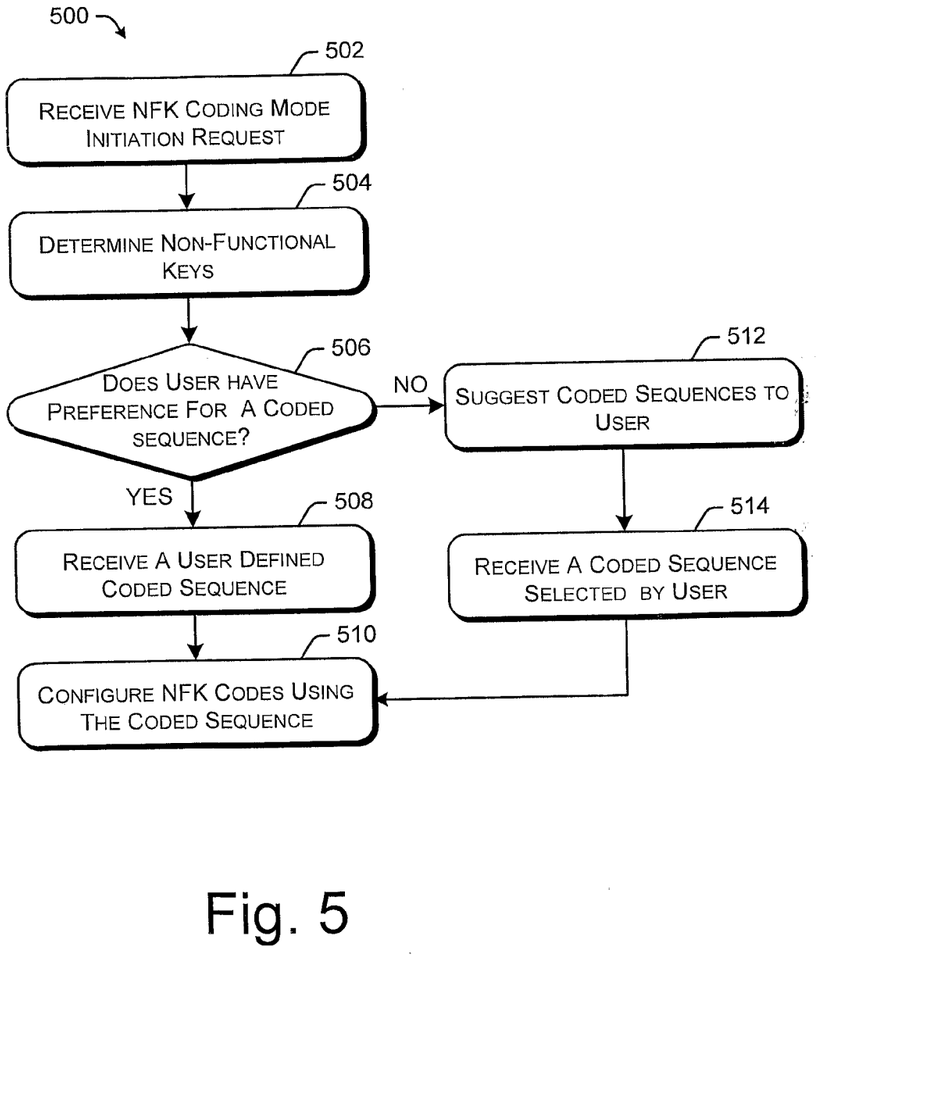
FIG. 5 illustrates an exemplary method of configuring NFK codes, in an electronic device, based on user preferences.

FIGS. 3, 4 and 5 illustrate exemplary methods 300, 400 and 500 of entering functions associated with a non-functional key of a keyboard in an electronic device, in, accordance with two different implementations of system 100, and configuring NFK codes based on user preferences. These exemplary methods may be described in the general context of computer executable instructions. Generally, computer executable instructions can include routines, programs, objects, components, data structures, procedures, modules, functions, and the like that perform particular functions or implement particular abstract data types.

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

In FIG. 3, at block 302 an NFK coding mode is activated on an electronic device by a user. For example, the user of a cell-phone may activate the NFK coding mode on his cell-phone by sending a request for NFK codes via short message service (SMS) to his or her service provider. On acceptance of the request, the user can download the NFK codes sent from the service provider onto the memory or the subscriber identity module (SIM) card memory of the cell-phone. Alternatively, the cell-phone user may call an operator and request activation of NFK coding mode on the cell-phone. In another implementation, the NFK coding mode initiation may be voice activated.

If the NFK codes are pre-configured in the electronic device or are user configured through an application, the user may not have to send a request. In such a case, the user can input an NFK coding mode initiation command to initiate the NFK coding mode. User equipments such as remote controllers, DVD players and calculators that are usually not connected to a network can have pre-configured NFK codes or applications for user-configuration of NFK codes. Even user equipments normally connected to a network during use, such as mobile phones, may use pre-configured NFK codes or applications for user-configuration of NFK codes.

At block 304, once the NFK coding mode is active in the electronic device, a coded sequence that corresponds to the NFK code of a function associated with a non-functional is key is received on actuation of the coded sequence by the user. Consider the example of a cell-phone as discussed above. After the NFK coding mode is activated, the user may enter a coded sequence to represent a function associated with a particular non-functional key. For instance, if the key incorporating characters "3", "d", "e", "f" and other symbols is non-functional, the user may enter a coded sequence "##4" to represent the characters "3", sequence "##5" to represent the characters "d", sequence "##6" to represent the characters "e", or sequence "##7" to represent the characters "f", and so on. Each of these sequences corresponds to an NFK code and in turn every NFK code has an associated function. For instance, the sequence ##4 may correspond to an NFK code 00100 which in turn is associated with the function of indicating the character "3'" to a processor of the cell-phone. In one implementation, a sequence actuated by the user may be same as the NFK code. In such an implementation, the user may directly actuate the NFK code, say 00100 in the above example instead of the coded sequence ##4. Therefore, a user needs to be made aware of the sequence or NFK code that needs to be actuated to perform the associated function. Accordingly, a table of code sequence or NFK codes along with their respective functions may be provided to the user in the form of a user manual. The user manual may be downloaded at the time of activating the NFK coding mode or else may be saved in the system memory.

Alternatively, in the implementation where a user calls an operator for activation of the NFK coding mode in accordance with step 302, the user may be given an option of defining coded sequences as he may desire. When the user defines coded sequences for the functions associated with a non-functional key, the operator configures the coded sequences as defined by the user and provides corresponding NFK codes to the user for downloading at block 302. Thereupon, at block 304, a coded sequence actuated by the user is received as an input. The user may activate one or more functional keys in a sequence corresponding to the NFK code of a function of the non-functional key.

At block 306, the function corresponding to the sequence entered at block 304 is identified. For the purpose, as explained hereinbefore, NFK codes are used. Suppose the user actuates the "4" key twice followed by the key representing "4", the NFK code function corresponding to the sequence "##4" is searched and identified from the list of, NFK codes. Based on the identified NFK code, the function to be performed is determined. At block 308, a function identified based on the input coded sequence is entered into the processor of the device as an input.

In FIG. 4, the method 400 is initiated at block 402, where the NFK coding mode is, activated on a electronic device by a user in a manner similar to that described for block. 302 above. Subsequently, at block 404, the user is allowed to enter functional keys in a specified sequence, i.e., in the sequence corresponding to the NFK code that represents a non-functional key, in a manner similar to that described for block 304 above.

The method 400 then proceeds to block 406. In the method 300 discussed above with reference to FIG. 3, NFK codes are assigned to every function of a non-functional key and the coded sequence of functional keys corresponds to one function of the non-functional key. Unlike method 300, in method 400, NFK codes are assigned to a non-functional key and at block 406, when the user enters the coded sequence corresponding to the NFK code of a key, all the functions associated with that non-functional key are displayed on a visual display unit (VDU) coupled to the user electronic device. The functions associated with the key may include entering an alphanumeric character, entering a symbol and entering a command to perform an action associated with the non-functional key, as explained earlier.

Consider the example explained with reference to FIG. 3. When the user actuates the keys "#" followed by "#" and "4", the characters, "3", "d", "e", "f" and other symbols associated with the nonfunctional key are displayed on the VDU of the cell-phone. At block 408, the user is allowed to select a character or symbol by using methods such as arrow keys of the keyboard or joystick of the cell-phone or a touch screen interface and the like. The user selected character is then sent as an input to the processor of the electronic device at block 410.

FIG. 5 illustrates an exemplary method 500 of configuring a coded sequence that invokes corresponding NFK codes, based on user preferences. As mentioned above, in one implementation, the coded sequence may match with the corresponding NFK code. In such an implementation, the method 500 may be used to configure the NKF code in a manner similar to the coded sequence. The method 500 may be implemented in the device by an application used for configuring the NFK codes. Alternatively, the method 500 may be implemented at the server that interacts with the device via a network.

At block 502, the application receives a request for initiating the NFK coding mode. The request, as described earlier, may be sent via a message from the device to the server or via a web application or may be a voice command, etc.

At block 504, after initiation of the NFK coding mode, the application determines which keys in the device are non-functional. For this, the application may prompt the user to provide the list of non-functional keys, or the application may receive the list as a part of the initiation request.

At block 506, the application determines whether the user has any preferences for coded sequences, and prompts the user to enter a preferred sequence to configure an NFK code that would substitute a non-functional key. If the user enters a preferred sequence ("Yes" branch from block 506), then at block 508, the user defined sequence is received. Based on the received sequence the NFK codes are configured with the user defined sequence at block 510.

On the other hand, if at block 506, the user does not enter any preferred sequence ("No" branch from block 506), then at block 512, the application suggests one or more possible sequences to the user, and prompts the user to select a preferred sequence from amongst the suggested sequences. At block 514, a selected sequence is received from the user and the NFK codes are configured with the user selected sequences at block 510.

By implementing the above described methods and systems, a user is enabled to use the characters, values or functions associated with a non-functional key of the to keyboard or keypad provided on the electronic device without changing any hardware component of the electronic device. Further, this eliminates any compromise with the aesthetics of the electronic device and the immediate requirement of visiting a service centre.

While certain features of the claimed subject matter have been illustrated and is described herein, many modifications, substitutions, changes, and equivalents will now occur to those skilled in the art. It is, therefore, to be understood that the appended claims are intended to cover all such modifications and changes that fall within the true spirit of the claimed subject matter.

We claim:

1. A system comprising:
a keyboard processor module configured to communicate an actuation of functional keys of a keyboard;
a memory comprising non-functional key (NFK) codes; and
a processor coupled to the memory and the keyboard processor module, the processor comprising an NFK coding mode processor configured to:
in response to detecting an NFK coding initiation command, activate an NFK coding mode by sending a request to a server for downloading NFK codes and receiving the NFK codes sent by the server in response to the request, wherein the NFK coding initiation command is a coded sequence of functional keys and none of the functional keys are dedicated to activating the NFK coding mode, and the request is sent using a short message service (SMS); and
during the NFK coding mode, indicate a function associated with a non-functional key to the processor based on the NFK codes and a successive actuation of at least two functional keys; and
wherein NFK codes are downloaded onto the memory from a server through a network.

2. The system as claimed in claim 1, wherein the NFK coding mode processor indicates the function associated with the non-functional key, in response to an actuation of a plurality of functional keys in a coded sequence.

3. The system as claimed in claim 2, wherein the coded sequence corresponds to at least one NFK code.

4. The system as claimed in claim 2, wherein the coded sequence is user-defined.

5. The system as claimed in claim 1, wherein NFK codes are pre-configured in the memory.

6. The system as claimed in claim 1, wherein the NFK coding mode processor is activated upon receiving the NFK coding initiation command.

7. The system as claimed in claim 1, wherein the system is a cell-phone.

8. A method comprising:
in response to detecting an NFK coding initiation command, activating an NFK coding mode for a device by sending a request to a server for downloading NFK codes and receiving the NFK codes sent by the server in response to the request, wherein the NFK coding initiation command is a coded sequence of functional keys and none of the functional keys are dedicated to activating the NFK coding mode, and the request is sent using a short message service (SMS); and during the NFK coding mode:

receiving a coded sequence from a successive actuation of two or more unaltered functional keys of the device;

identifying a function corresponding to the coded sequence, wherein the function is associated with a non-functional key of the device; and performing the function.

9. The method as claimed in claim 8, wherein the request is sent through at least one of a short message service (SMS), a phone call, an application, and a web page.

10. The method as claimed in claim 8, wherein the request includes a description of the device.

11. The method as claimed in claim 8, wherein the activating comprises retrieving NFK codes preconfigured in a memory.

12. The method as claimed in claim 8, wherein the activating comprises displaying the activation of the NFK coding mode.

13. The method as claimed in claim 8, wherein the performing comprises at least one of entering an alphanumeric character, entering a symbol, and entering a command to perform an action associated with the non-functional key.

14. The method as claimed in claim 8, further comprising resetting the NFK coding mode for the device.

15. The method as claimed in claim 14, wherein the resetting comprises receiving an NFK coding reset command.

16. The system of claim 1, wherein the NFK coding mode processor is further configured to:

receive an indication to initiate the NFK coding mode; and in response to the indication, initiate the NFK coding mode.

17. The system of claim 16, wherein the NFK coding mode processor is further configured to indicate the function associated with the non-functional key to the processor while the NFK coding mode processor is operating in the NFK coding mode.

* * * * *